A. RIOUX.
RAILWAY SIGNALING SYSTEM.
APPLICATION FILED JULY 29, 1910.
1,051,263.
Patented Jan. 21, 1913.
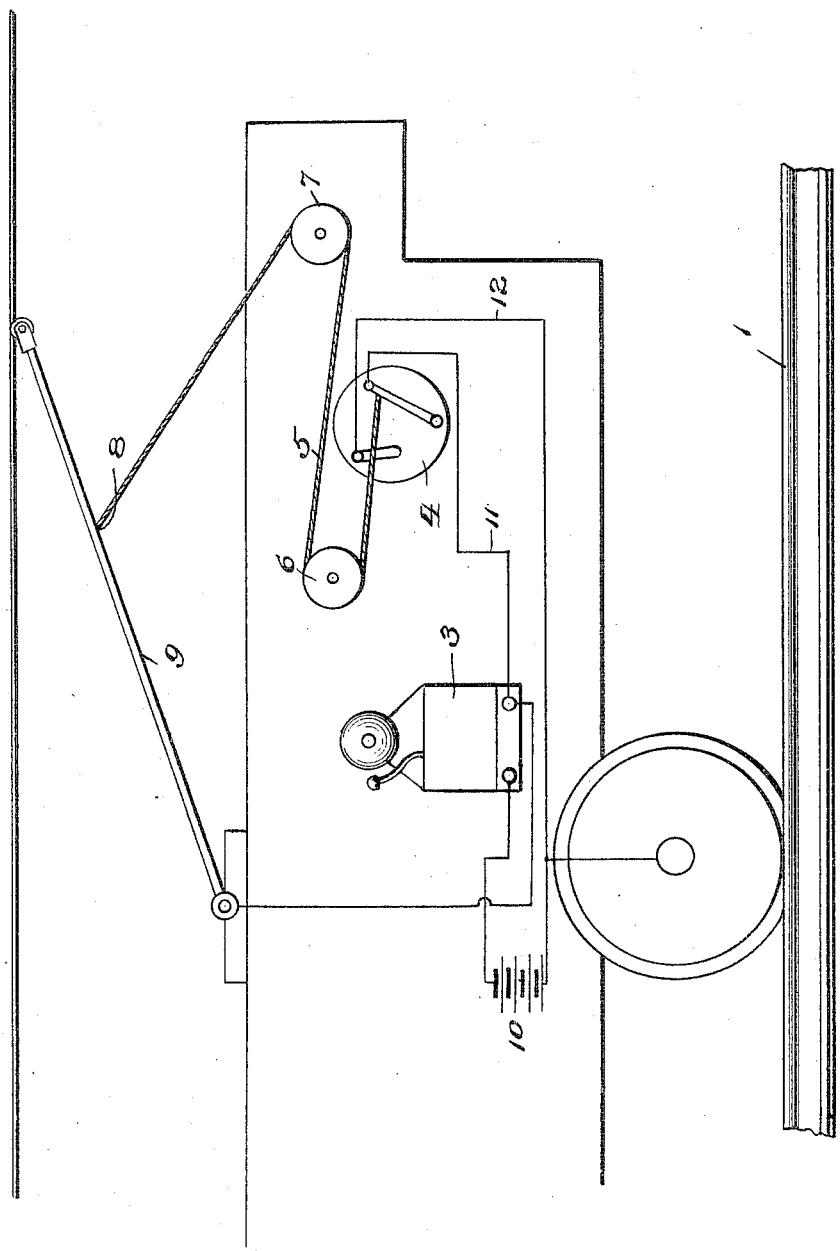
Witnesses
J. M. Fowler Jr.
R. S. Trogner
Inventor
Alphonse Rioux
By Mason Fenwick & Lawrence
Attorneys

UNITED STATES PATENT OFFICE.

ALPHONSE RIOUX, OF NASHUA, NEW HAMPSHIRE.

RAILWAY SIGNALING SYSTEM.

1,051,263.  Specification of Letters Patent.  Patented Jan. 21, 1913.

Original application filed February 1, 1910, Serial No. 541,330. Divided and this application filed July 29, 1910. Serial No. 574,484.

*To all whom it may concern:*

Be it known that I, ALPHONSE RIOUX, a citizen of the United States, residing at Nashua, in the county of Hillsboro and State of New Hampshire, have invented certain new and useful Improvements in Railway Signaling Systems; and I do hereby declare the following to be a full, clear, and exact description of the invention, such as will enable others skilled in the art to which it appertains to make and use the same.

This invention relates to improvements in railway signaling systems.

The object in view is the arrangement in a signaling system using a trolley pole connection, of means for automatically sounding a signal when the trolley pole is dislocated.

Another object in view is the arrangement in a signaling system in which a trolley pole is used, of a cable and means associated therewith for switching into operation an audible signal near the trolley pole for indicating when the trolley pole jumps off its trolley or becomes dislocated in any way.

With these and other objects in view the invention comprises certain novel constructions, combinations, and arrangement of parts as will be hereinafter more fully described and claimed.

In the accompanying drawings, the figure is an enlarged view showing the elements of the invention.

In constructing a signaling device for a railway signaling system according to the present invention, a system of any desired kind may be used in which a trolley wire is provided and a trolley pole and wheel for the wire. The trolley pole just mentioned, according to the present invention, is connected with the locomotive or other vehicle, and has connected therewith a cable passing over guiding pulleys to a switch or to a signaling device as preferred for causing the signaling device to operate directly or through the switching on of the electric current thereof when the trolley pole jumps or leaves the trolley wire, the movement of the trolley pole pulling said cable.

In order that the invention may be more clearly understood an embodiment of the same is shown in the accompanying drawings, in which 1 indicates the track of the railway, and 2 the trolley wire arranged directly above or above and at one side of the track.

Arranged in engine 325 is an electrical bell 3 which is operated whenever switch 4 is closed. Switch 4 has connected therewith a cable 5 which passes over guiding pulleys 6 and 7 and is secured at 8 to trolley pole 9. By this arrangement whenever trolley pole 9 jumps or leaves trolley wire 2 cable 5 will be pulled, and switch 4 closed. When switch 4 is closed current will flow from battery 10, through bell 3, wire 11, switch 4, and wire 12. As soon as the trolley pole 9 has been restored to its normal position with its wheel engaging trolley wire 2, the tension will be removed from cable 5 and switch 4 may be manually opened. The switch 4 will then remain open until either manually closed, or closed by another pull on cable 5.

This is a divisional application removed from application for railway signaling systems filed February 1, 1910, Serial Number 541,330.

What I claim is:

1. In a train signaling system, the combination with a track, of signaling mechanism for trains designed to pass over said track, said signaling mechanism comprising a signaling device, a local circuit for said signaling device, a source of power, and means for connecting one side of said source of power with said track, a trolley, a trolley wire, and means operated by said trolley when the same jumps off said trolley wire for closing said local circuit of said signaling device.

2. In a signaling system, a track, a trolley wire above or along said track, an electrical generator and alarm carried by each car on said track, a trolley pole carried by each car on said track, the normal electrical circuit being through the track, generator, alarm and trolley wire through the trolley pole, a second circuit including said alarm and said generator, a switch interposed in said second circuit, and a mechanical connection from said trolley pole to close said switch upon movement of said trolley pole.

In testimony whereof I affix my signature in presence of two witnesses.

ALPHONSE RIOUX.

Witnesses:
STEPHEN L. HALLINAN,
JOSEPH P. CLOUGH.

Copies of this patent may be obtained for five cents each, by addressing the "Commissioner of Patents, Washington, D. C."